(12) United States Patent
Emmerling

(10) Patent No.: US 6,850,154 B2
(45) Date of Patent: Feb. 1, 2005

(54) METHOD AND DEVICE FOR PROTECTING MOTOR VEHICLES AGAINST THEFT

(75) Inventor: Ulrich Emmerling, Kelheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/317,614

(22) Filed: Dec. 12, 2002

(65) Prior Publication Data

US 2003/0107469 A1 Jun. 12, 2003

(30) Foreign Application Priority Data

Dec. 12, 2001 (DE) .......................................... 101 60 964

(51) Int. Cl.$^7$ ............................................. B60R 25/10
(52) U.S. Cl. .............................. 340/426.1; 340/426.16; 340/5.72; 340/5.21; 340/5.6; 307/10.2
(58) Field of Search ..................... 340/426.1, 426.16, 340/426.17, 5.7, 5.72, 5.2, 5.21, 5.6, 426.36, 426.23, 904, 5.28, 5.31, 5.61, 5.62, 5.63; 307/10.2, 10.4; 116/33, 85, 86; 180/287

(56) References Cited

U.S. PATENT DOCUMENTS 6,075,454 A * 6/2000 Yamasaki ................... 340/5.61
6,194,997 B1 * 2/2001 Buchner et al. ........ 340/426.26

FOREIGN PATENT DOCUMENTS

DE 197 11 901 c1 8/1998 ........... B60R/25/00

* cited by examiner

Primary Examiner—Jeffery Hofsass
Assistant Examiner—Eric Blount
(74) Attorney, Agent, or Firm—Baker Botts L.L.P.

(57) ABSTRACT

A code signal generator (3) of a system for protecting against theft remains in the motor vehicle while it is not operating, this code signal generator (3) is disabled as soon as a door of the motor vehicle is opened and closed again and/or a security device (8, 9) is locked with another authorized code signal generator (3). The disabled code signal generator (3) is enabled again only if, after the opening of a door or after the unlocking of a locking device (8, 9), another code signal generator (3) in the vicinity outside the vehicle is recognized as authorized and a request signal which is triggered manually by the user for enabling the disabled code signal generator (3) is received by the control unit (1).

19 Claims, 2 Drawing Sheets

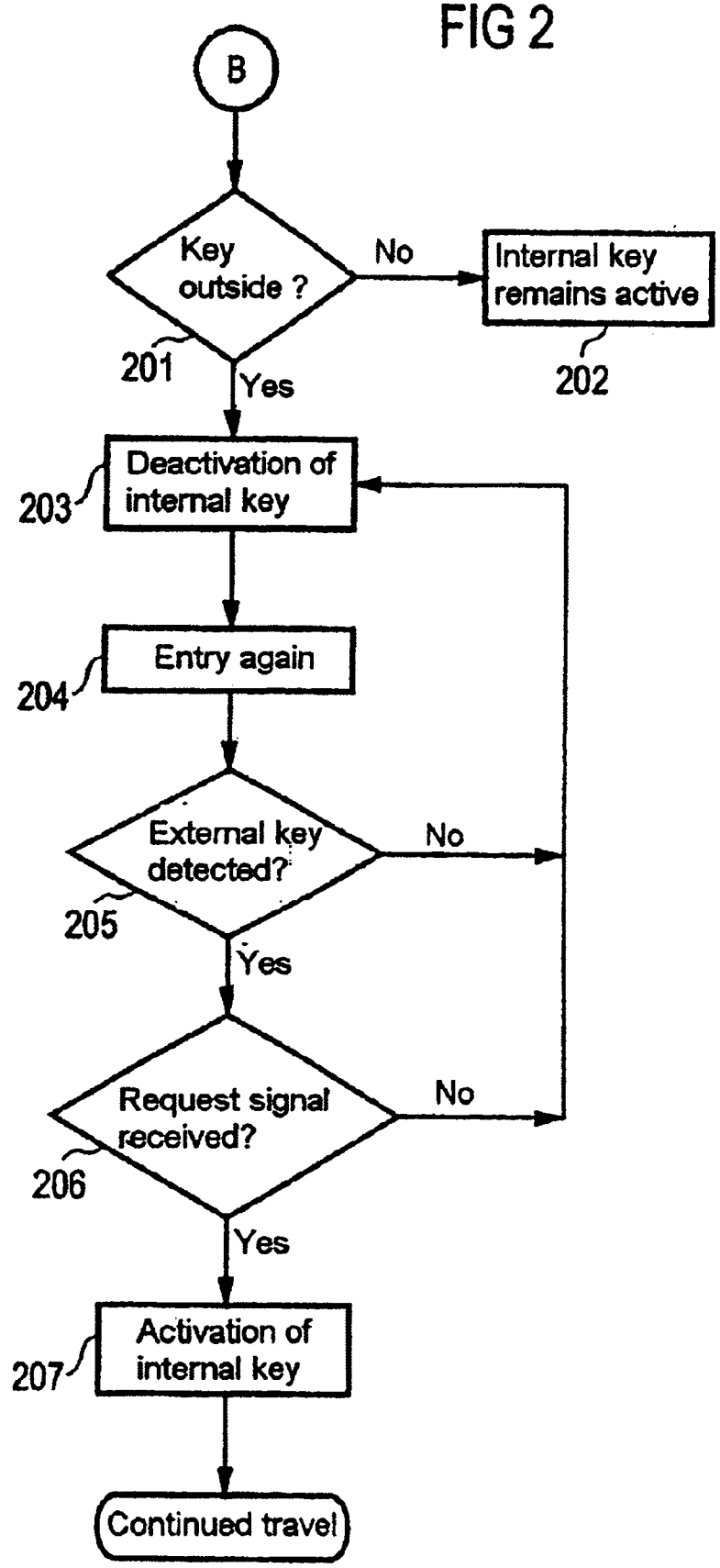

METHOD AND DEVICE FOR PROTECTING MOTOR VEHICLES AGAINST THEFT

BACKGROUND OF THE INVENTION

The invention relates to a method and a device for protecting motor vehicles against theft, in particular a keyless, remote-controlled central locking system and an electronic immobilizer.

A known system for protecting against theft (DE 197 11 901 C1) divides the code signal generators assigned to the vehicle into what are referred to as external keys and internal keys. With external keys, the central locking system and the immobilizer can be remote-controlled. The internal keys are used only to activate the vehicle and are disabled if they are located in the vehicle and the user leaves the vehicle, and/or locks the doors of the vehicle, using another authorized key. The internal keys located in the vehicle are enabled again as soon as the doors are unlocked with an authorized key and/or the vehicle door is opened and an authorized key is recognized. Every internal key located in the vehicle is enabled as a result of each authorized access to the motor vehicle. A method for automatically enabling all the disabled code signal generators is disclosed.

Therefore, even keys which the user of the motor vehicle does not know are located in the interior of the motor vehicle are therefore enabled. Under unfavorable circumstances this can lead to a situation in which an unauthorized user can come into possession of an operationally capable key.

SUMMARY OF THE INVENTION

The invention is based on the object of providing a method and a device for protecting motor vehicles against theft, which prevent unauthorized use of code signal generators which have been left behind in the vehicle.

This object may be achieved according to the invention by a method for protecting motor vehicles against theft, which has the following method steps:

one or more security devices are locked or unlocked if a code signal received in a control unit from a code signal generator has been successfully authenticated, and the function of a code signal generator located in the interior of the motor vehicle is at least partially disabled if the motor vehicle is not operating and a door of the vehicle is opened and closed and another code signal generator in the vicinity is recognized as being authorized and/or another code signal generator in the vicinity is recognized as being authorized after the motor vehicle has been locked, wherein the disabled code signal generator located in the vehicle is enabled only if, after the release of one or more security devices using another code signal generator and/or after a door opens, another code signal generator in the vicinity is recognized as being authorized and an enable request signal of the disabled code signal generator which is triggered manually by the user is received by the control unit.

The disabled code signal generator can be enabled only within a predetermined time period after the release of a security device. The code signal generator may be requested by the control unit to transmit the enable request signal on the basis of its spatial position with respect to a transmitting and receiving unit. The enable request signal of the disabled code signal generator can be triggered by at least a single activation of one or more switches of the disabled code signal generator.

A device according to the present invention for protecting motor vehicles against theft, which has a control unit and a plurality of code signal generators will be disclosed, wherein the code signal generators each have at least one transmitter which transmits code signals which have authentication data and control data, and wherein the control unit or the code signal generator have a switching unit for disabling a code signal generator located in the motor vehicle, which switching unit at least partially disables the function of the code signal generator if the motor vehicle is not operating and a door of the vehicle is opened and closed and the control unit recognizes another code signal generator in the vicinity as being authorized and/or recognizes another code signal generator in the vicinity as being authorized after the motor vehicle is locked, wherein the control unit has a switching unit for enabling disabled code signal generators which enables the disabled code signal generator after the reception of a manually triggered enable request.

The enabling of the disabled code signal generator may take place in the control unit itself or as a result of the transmission of a signal to a switching unit of the code signal generator. Each code signal generator can have at least one switch which transmits an enable request signal when activated. The control unit can have a transceiver unit for receiving a manually triggered enable request signal and also for transmitting signals to the code signal generators.

Yet another method for protecting motor vehicles against theft, may comprise the steps:

unlocking or locking at least one security device if a code signal received in a control unit from a code signal transceiver has been successfully authenticated, and disabling the function of a code signal transceiver located in the interior of the motor vehicle at least partially if the motor vehicle is not operating and another code signal transceiver in the vicinity is recognized as being authorized, wherein the disabled code signal transceiver located in the vehicle is enabled only if after a door opens, another code signal transceiver in the vicinity is recognized as being authorized and an enable request signal of the disabled code signal transceiver which is triggered manually by the user is received by the control unit.

The step of disabling the function of the code signal transceiver may be performed only if a door of the vehicle is opened and closed. The step of disabling the function of the code signal transceiver may be performed only after the motor vehicle has been locked. The disabled code signal generator located in the vehicle can be enabled only if in addition one or more security devices are released using another code signal generator. The disabled code signal generator can enabled only within a predetermined time period after the release of a security device. The code signal generator can be requested by the control unit to transmit the enable request signal on the basis of its spatial position with respect to a transmitting and receiving unit. The enable request signal of the disabled code signal generator can be triggered by at least a single activation of one or more switches of the disabled code signal generator.

Another device for protecting motor vehicles against theft, may comprise a control unit and a plurality of code signal transceivers, wherein the control unit or the code signal transceiver havs a switching unit for disabling a code signal generator located in the motor vehicle, and wherein the switching unit at least partially disables the function of the code signal generator if the motor vehicle is not operating and a door of the vehicle is opened and closed and the control unit recognizes another code signal generator in the vicinity as being authorized and/or recognizes another code signal generator in the vicinity as being authorized after the motor vehicle is locked, wherein the control unit has a switching unit for enabling disabled code signal generators which enables the disabled code signal generator after the reception of a manually triggered enable request.

Each code signal generator may have at least one switch which transmits an enable request signal when activated. The control unit can have a transceiver unit for receiving a manually triggered enable request signal and also for transmitting signals to the code signal generators. The code signal transceivers may each have at least one transmitter which transmits code signals which have authentication data and control data.

Generally, a plurality of code signal generators which each transmit a code signal when necessary are assigned to the motor vehicle. By means of a successfully authenticated code signal it is possible to lock or unlock door locks or other locking points as well as release an electronic immobilizer. If a code signal generator remains in the motor vehicle while it is not operating, this code signal generator is disabled as soon as a door of the motor vehicle is opened and closed again and/or a security device is locked with another authenticated code signal generator. The disabled code signal generator is enabled again only if, after the opening of the door or after the unlocking of a security device, another code signal generator in the vicinity outside the vehicle is recognized as being authorized and a request signal which is triggered manually by the user for enabling (enable request signal) the disabled code signal generator is received by the control unit.

The advantage of the disclosed method and the device is that a disabled code signal generator is enabled again only if this is expressly desired by the user of the motor vehicle.

BRIEF DESCRIPTION OF THE FIGURES

Exemplary embodiments are explained in more detail below with reference to the schematic drawings, in which:

FIG. 2 shows a flowchart which shows the steps of the method according to the invention.

DETAILED DESCRIPTION OF THE PREFERRED EMBODIMENTS

Figure 1:
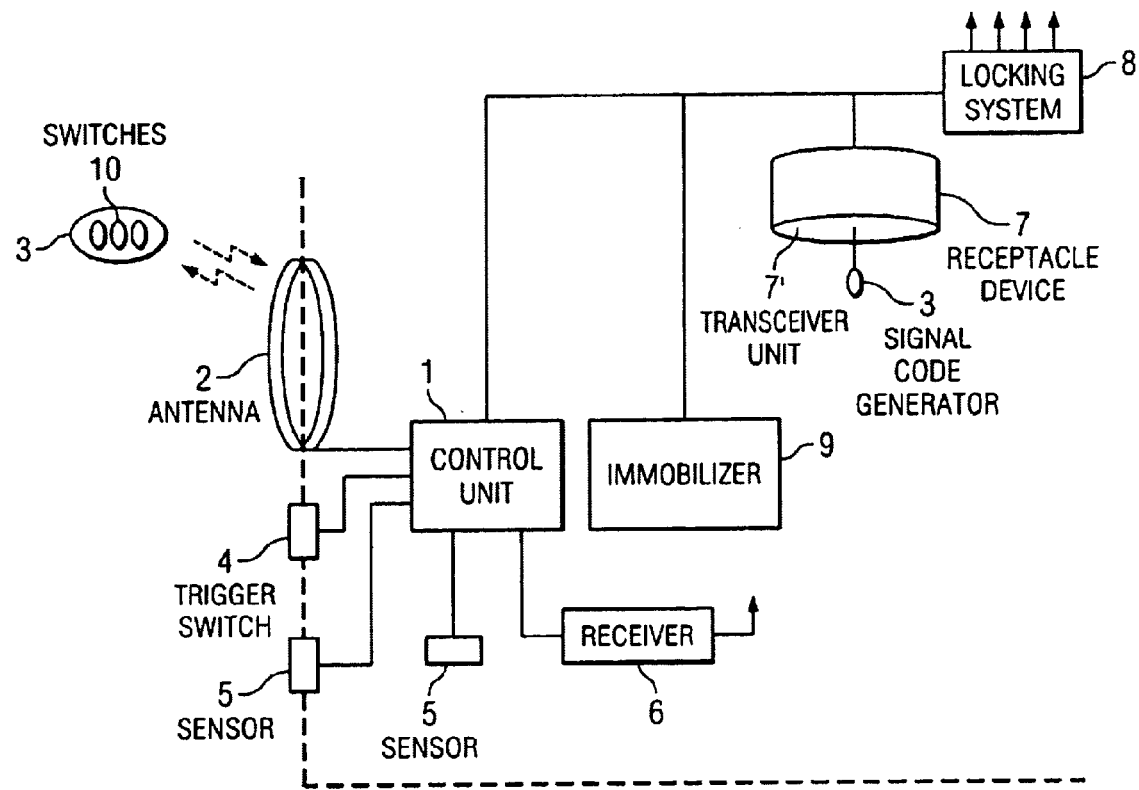
FIG. 1 shows a block circuit diagram of the device according to the invention for protecting a motor vehicle against theft.

The device according to the invention as shown in FIG. 1 has a control unit 1, an antenna 2 and a plurality of code signal generators 3. The control unit 1 transmits a request signal to the code signal generators 3 via the antenna 2. The signals of the code signal generators 3 are also received via this antenna 1 or further antennas. The request signal can be triggered, for example, by means of a trigger switch 4.

The antenna 2 can be embodied as an antenna system composed of a plurality of individual antennas. The directional characteristic of the antenna system is influenced by actuating the individual antennas. In this way, the request signal can be selectively transmitted into the interior or into the space outside the motor vehicle.

Each code signal generator 3 which receives a request signal transmits its code signal. This code signal is in turn received by the antenna 2. The code signal has authentication data and control data. The antenna 2 is electrically connected to the control unit 1 and supplies the latter with the code signal received from the code signal generator 3.

Each code signal generator 3 has authentication data which permit unambiguous determination of authorization at least for the assignment between the motor vehicle and code signal generator 3.

The device can have one or more state sensors 5 which are also electrically connected to the control unit 1. The state sensors 5 supply the control unit 1 with various information relating to the state of the motor vehicle, for example whether doors or windows are open or closed.

Furthermore, the control unit 1 can have an additional receiver 6 which can receive signals transmitted by a code signal generator 3 from a large distance.

A receptacle device 7 for a code signal generator 3 can be arranged in the region of the steering wheel, the dashboard or the central console. The receptacle device 7 has a transceiver unit 7' which transmits request signals to the code signal generator 3 in the receptacle device 7, as well as receiving code signals from it and passing them on to the control unit 1 for processing.

As an alternative to the receptacle device 7, via the antenna 2 or a special internal antenna, the transceiver unit 7' can also transmit data to, or receive data from, a code signal generator 3 which is located in the interior of the motor vehicle.

The authentication data which forms part of the code signal is checked for its authorization in the control unit 1. After a positive check, the requested control functions are carried out in accordance with the control data contained in the code signal. This control function may be, for example, the unlocking or locking of security devices of a motor vehicle, for example of a central locking system 8. Further devices for protecting against unauthorized use of the motor vehicle, for example an electronic immobilizer 9, can also be activated or deactivated using the function signal.

The individual steps of an exemplary embodiment of the method according to the invention are explained with reference to the flowchart illustrated in FIG. 2.

If a user leaves the motor vehicle while the drive engine is switched off (also referred to as "ignition off" in the case of an internal combustion engine), the opening and closing of a door is registered using state sensors 5 and the control unit 1 transmits a request signal into the vicinity outside the motor vehicle. The vicinity comprises the region to a distance of several meters around the motor vehicle.

If the user has an authorized code signal generator 3 (referred to as external key) on his person and the latter receives the transmitted request signal, the external key 3 responds with a code signal (step 201). The authentication data is then tested for its authorization by the control unit 1.

If a code signal generator 3 (referred to as internal key) happens to be located in the interior of the vehicle, said code signal generator 3 does not respond to the request signal as the field generated by the antenna 2 does not penetrate the interior of the vehicle, or only does so in a highly attenuated way, owing to the transmission characteristic of said antenna 2 and/or the metal bodywork of the vehicle.

After the authentication signal of the external key 3 in the vicinity of the motor vehicle has been recognized as authorized, it is checked whether one or more authorized internal keys 3 are located in the interior of the vehicle. For this purpose, the request signal is transmitted into the interior of the vehicle. This can be done, for example, by changing the directional characteristic of the antenna 2 or by means of an additional internal antenna. If at least one internal key 3 located in the interior of the vehicle is then recognized, the control unit 1 can entirely or partially disable the function of said internal key 3 (step 203).

The term disabling a code signal generator 3 is to be understood both as the disabling of the code signal generator 3 itself and the disabling of the execution by the control unit 1 of the function requested in the control data.

For this purpose, the control unit 1 or the code signal generator 3 has a switching unit which disables the execution and the transmission of the control data.

After the code signal generator 3 has been disabled, it may still be capable of transmitting code signals to the control unit 1. These code signals are then recognized as unauthorized by the control unit 1 on the basis of the disabling and the control function which is requested in the control data is consequently not executed.

Furthermore, it is possible to restrict the control data which can be transmitted by a disabled code signal generator 3 to such an extent that the control data can contain only an enable request for enabling the disabled code signal generator 3.

If the user leaves the motor vehicle without a valid external key 3 being recognized in the vicinity outside the motor vehicle, the internal keys 3 located in the interior of the vehicle remain activated (step 202).

If the state sensors 5 detect that a vehicle door is opened again, a request signal is transmitted to the outside again (step 204). If an authorized external key 3 in the vicinity of the motor vehicle responds (step 205), a disabled internal key 3 is enabled again only if the transmission of an enable request signal of the disabled internal key 3 to the control unit 1 is triggered manually by the user (steps 206 and 207). After the enabling, the original functionality of the previously disabled internal key is restored.

After the opening of the vehicle door, it is possible, if no authorized code signal generator 3 has been recognized in the vicinity outside the motor vehicle, that the interior is also checked for authorized code signal generators 3 and, if appropriate, disabled code signal generators 3 are enabled only after an enable request signal has been received.

The enable request signal can be triggered, for example, by activating one or more switches 10 on the disabled code signal generator 3. The code signal generator 3 then transmits a code signal to the control unit 1. The function signal which is part of the code signal requests the control unit 1 to enable specifically this code signal generator 3 again. However, this enabling takes place only if an authorized code signal generator 3 has previously been recognized in the vicinity or a security device 8 and 9 has been unlocked using an authorized code signal generator 3.

If the parked vehicle is locked after it has been left, the disabling of the code signal generators 3 located in the interior of the vehicle takes place as already described above. After the authorized unlocking of the motor vehicle using an authorized code signal generator 3, the disabled code signal generators 3 are also enabled again only if each disabled code signal generator 3 transmits one enable request signal which is activated manually by the user.

A further possible way of transmitting an enable request signal for a disabled code signal generator 3 to the control unit 1 is to place the disabled code signal generator 3 manually in the vicinity of an antenna 2 or of the further transceiver unit 7'. The transceiver unit 7' may be arranged, for example, in the region of the dashboard or the central console and is electrically connected to the control unit 1.

A request signal requesting the transmission of an enable request signal can also be sent to disabled code signal generators 3 by the transceiver unit 7' at specific time intervals. If the disabled code signal generator 3 receives the request signal, it subsequently transmits the enable request signal to the transceiver unit 7' which passes on the enable request signal to the control unit 1.

It is also possible for the disabled code signal generator 3 to emit the enable request signal at specific time intervals and for this signal to be received by the transceiver unit 7' if the user places the disabled code signal generator 3 in the spatial vicinity of the transceiver unit 7'. Here too, the enabling takes place only after an authorized code signal generator 3 has been recognized. The transmission between the code signal generator 3 and transceiver unit 7' can take place electrically, by radio, inductively or optically.

The method explained here can also be developed advantageously by virtue of the fact that the enabling of a disabled code signal generator 3 can take place only within a previously defined time period after the recognition of an authorized code signal generator 3.

What is claimed is:

1. A method for protecting motor vehicles against theft, which has the following method steps:

one or more security devices are locked or unlocked if a code signal received in a control unit from a code signal generator has been successfully authenticated, and the function of a code signal generator located in the interior of the motor vehicle is at least partially disabled if the motor vehicle is not operating and a door of the vehicle is opened and closed and another code signal generator in the vicinity is recognized as being authorized and/or another code signal generator in the vicinity is recognized as being authorized after the motor vehicle has been locked, wherein the disabled code signal generator located in the vehicle is enabled only if, after the release of one or more security devices using another code signal generator and/or after a door opens, another code signal generator in the vicinity is recognized as being authorized and an enable request signal of the disabled code signal generator which is triggered manually by the user is received by the control unit.

2. The method as claimed in claim 1, wherein the disabled code signal generator is enabled only within a predetermined time period after the release of a security device.

3. The method as claimed in claim 1, wherein the code signal generator is requested by the control unit to transmit the enable request signal on the basis of its spatial position with respect to a transmitting and receiving unit.

4. The method as claimed in claim 1, wherein the enable request signal of the disabled code signal generator is triggered by at least a single activation of one or more switches of the disabled code signal generator.

5. A device for protecting motor vehicles against theft, which has a control unit and a plurality of code signal generators, the code signal generators each having at least one transmitter which transmits code signals which have authentication data and control data, and the control unit or the code signal generator having a switching unit for disabling a code signal generator located in the motor vehicle, which switching unit at least partially disables the function of the code signal generator if the motor vehicle is not operating and a door of the vehicle is opened and closed and the control unit recognizes another code signal generator in the vicinity as being authorized and/or recognizes another code signal generator in the vicinity as being authorized after the motor vehicle is locked, wherein the control unit has a switching unit for enabling disabled code signal generators which enables the disabled code signal generator if, after the release of one or more security devices using another code signal generator and/or after a door opens, another code signal generator in the vicinity is recognized as being authorized and after reception of a manually triggered enable request.

6. The device as claimed in claim 5, wherein the enabling of the disabled code signal generator takes place in the control unit itself or as a result of the transmission of a signal to a switching unit of the code signal generator.

7. The device as claimed in claim 5, wherein each code signal generator has at least one switch which transmits an enable request signal when activated.

8. The device as claimed in claim 5, wherein the control unit has a transceiver unit for receiving a manually triggered enable request signal and also for transmitting signals to the code signal generators.

9. A method for protecting motor vehicles against theft, comprising the steps:

unlocking or locking at least one security device if a code signal received in a control unit from a code signal transceiver has been successfully authenticated, and disabling the function of a code signal transceiver located in the interior of the motor vehicle at least partially if the motor vehicle is not operating and another code signal transceiver in the vicinity is recognized as being authorized, wherein the disabled code signal transceiver located in the vehicle is enabled only if after a door opens, another code signal transceiver in the vicinity is recognized as being authorized and an enable request signal of the disabled code signal transceiver which is triggered manually by the user is received by the control unit.

10. The method as claimed in claim 9, wherein the step of disabling the function of the code signal transceiver is performed only if a door of the vehicle is opened and closed.

11. The method as claimed in claim 9, wherein the step of disabling the function of the code signal transceiver is performed only after the motor vehicle has been locked.

12. The method as claimed in claim 9, wherein the disabled code signal generator located in the vehicle is enabled only if in addition one or more security devices are released using another code signal generator.

13. The method as claimed in claim 9, wherein the disabled code signal generator is enabled only within a predetermined time period after the release of a security device.

14. The method as claimed in claim 9, wherein the code signal generator is requested by the control unit to transmit the enable request signal on the basis of its spatial position with respect to a transmitting and receiving unit.

15. The method as claimed in claim 9, wherein the enable request signal of the disabled code signal generator is triggered by at least a single activation of one or more switches of the disabled code signal generator.

16. A device for protecting motor vehicles against theft, comprising a control unit and a plurality of code signal transceivers, wherein the control unit or the code signal transceiver having a switching unit for disabling a code signal generator located in the motor vehicle, and wherein the switching unit at least partially disables the function of the code signal generator if the motor vehicle is not operating and a door of the vehicle is opened and closed and the control unit recognizes another code signal generator in the vicinity as being authorized and/or recognizes another code signal generator in the vicinity as being authorized after the motor vehicle is locked, wherein the control unit has a switching unit for enabling disabled code signal generators which enables the disabled code signal generator if after a door opens, another code signal transceiver in the vicinity is recognized as being authorized and after the reception of a manually triggered enable request.

17. The device as claimed in claim 16, wherein each code signal generator has at least one switch which transmits an enable request signal when activated.

18. The device as claimed in claim 16, wherein the control unit has a transceiver unit for receiving a manually triggered enable request signal and also for transmitting signals to the code signal generators.

19. The device as claimed in claim 16, wherein the code signal transceivers each having at least one transmitter which transmits code signals which have authentication data and control data.

* * * * *